Nov. 29, 1966 B. F. WAGNER 3,289,187

HIGH STABILITY MAGNETIC CORE SHIFT REGISTER

Filed May 29, 1963 2 Sheets-Sheet 1

INVENTOR:
BURTON F. WAGNER,

BY Delbert P. Warner

HIS ATTORNEY.

HIGH STABILITY MAGNETIC CORE SHIFT REGISTER

Filed May 29, 1963 2 Sheets-Sheet 2

INVENTOR:
BURTON F. WAGNER,
BY Delbert P. Warner
HIS ATTORNEY.

United States Patent Office 3,289,187
Patented Nov. 29, 1966

3,289,187
HIGH STABILITY MAGNETIC CORE SHIFT REGISTER

Burton F. Wagner, North Syracuse, N.Y., assignor to General Electric Company, a corporation of New York
Filed May 29, 1963, Ser. No. 284,078
11 Claims. (Cl. 340—174)

This invention relates to shift registers and in particular to improved magnetic core shift registers.

The prior art devices include shift registers which employ a single square loop toroidal core to store each bit of information. Limitations inherent in the cores severely limit such shift registers and particularly shift registers of a type called serial drive, gated transfer shift registers. In order to use toroidal cores in such shift registers the shape of the shift pulses and the amount of parallel loading must be carefully controlled or else special compensating circuits must be supplied which greatly increase cost and complexity. For example, with the prior art the "0" amplitude (or the magnetic field stored when the core is in its "0" state) is of a significant amplitude under circumstances, such as parallel readout, where this value should be as small as possible. Furthermore, when the core is in its "1" state and parallel readout is employed the resulting severe loading will tend to make the "1" signal small and, if loading becomes too great, the performance of the core circuit may be so adversely affected as to cause the "1" signal to degrade toward all zeros. Increasing the magnitude of the shift current under such heavy loading can change the characteristic response of the circuit so that it will again be capable of providing shifting "1's," but this results frequently in the building of all the "0" information to the "1" signal level.

It is therefore a primary objective of this invention to provide improved means for storing digital information.

It is an additional objective of this invention to provide improved means for reducing the "0" magnetic states in a magnetic core shift register to smaller magnitudes.

It is another objective of this invention to provide improved means for maintaining the range between "0" and "1" in a magnetic core shift register.

It is still another objective of this invention to provide means for preventing a loss of stability entailing the loss of all "0's" or all "1's" in a magnetic core shift register.

The foregoing objects and others ancillary thereto may be accomplished in shift registers by improvements in the magnetic circuits and in particular by changes in the magnetic core circuits. In order to improve the magnetic core circuits, in the absence of better core materials, the applicant has added an extra core to be linked to receive shift signals at the same time the original core receives shift signals. However, these extra cores are not coupled to receive input signals and therefore never become magnetized above the "0" saturation or "0" remanent state. Each original core in the shift register has an input winding and an output winding. Each of the extra cores is magnetically coupled to a matching output winding only. The output coils associated with each pair of cores are paired together and connected electrically in series so that potentials induced in them are in series opposition. As a consequence of this connection, the signals induced by the shift coil through the cores will always tend to oppose each other to reduce the output of the coils. When a "1" state is being transmitted it will be reduced slightly though not deterimentally by this action, but when a "0" is being transmitted there will be almost complete cancellation which will assure superior performance of the shift register. Thus superior performance will be obtained by increasing the difference between the "1" and "0" signals to make discrimination easier and by increasing the stability of the register making it more tolerant to varying applied conditions such as parallel loading or varying wave forms in the shift pulses.

For a fuller understanding of the nature and objects of the invention reference should be had to the following detailed description taken in connection with the accompanying drawings, in which.

Figure 1:
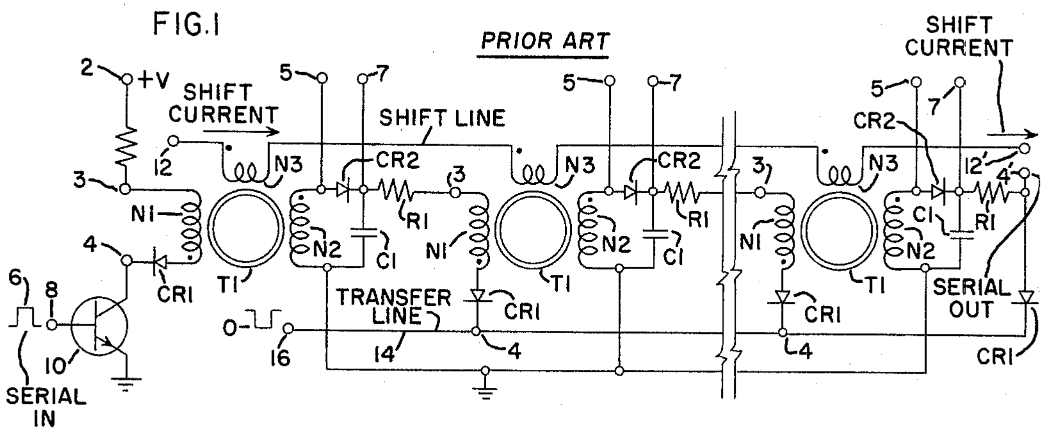
FIG. 1 is a diagram of a prior art magnetic core shift register.

Turning first to FIG. 1 we find a circuit diagram illustrating an example of the prior art. This particular circuit is shown and its functioning will be described briefly in order to establish the background of the present invention and at the same time to establish a basis for teaching how the present invention functions in as direct a way as possible. It should be kept in mind that the description of the functioning of FIG. 1 is directly applicable to an understanding of a preferred embodiment of the invention shown in FIG. 2.

Figure 2:
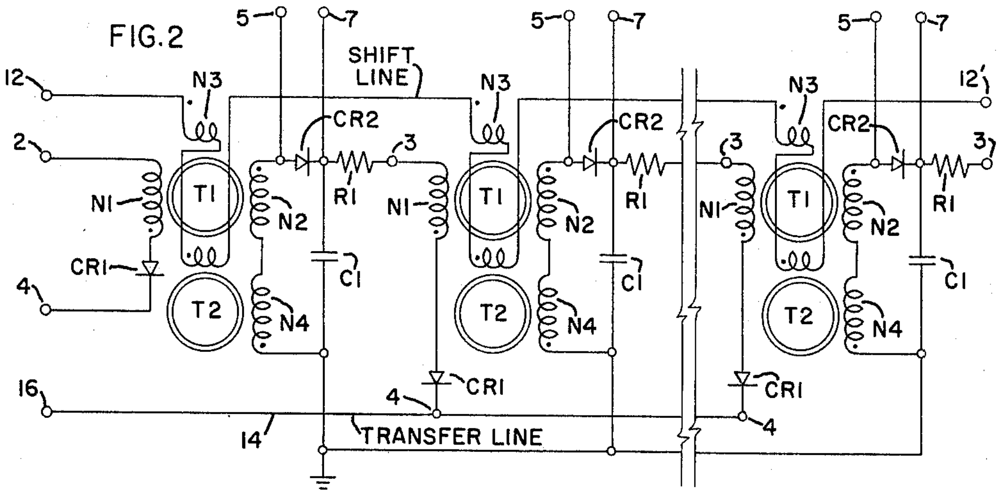
FIG. 2 is a diagram illustrating a preferred embodiment of the invention.

In FIG. 1 and in FIG. 2, a number of identical groups of elements are repeated through a plurality of stages. Since the functioning of each stage is like that of the next stage and the elements in each stage are identical to those in the next stage, the same symbols are repeated in each stage to designate the corresponding elements. Each stage of FIG. 1 includes a magnetic core T1 which is linked magnetically by coils N1, N2, and N3. The coil N1 represents an input coil which is coupled between a biasing voltage V at terminal 2, a terminal 3, and a terminal at 4. An input pulse, such as is shown at 6 may be supplied to a terminal at 8 to control a transistor at 10 which in turn regulates the flow of current through the coil N1. It will be recognized that other sources of an input pulse could be supplied, such as an earlier stage of a shift register. The input winding N1 links magnetically with the magnetic core T1, therefore current passing through N1 will drive the core to its magnetic saturation point. When the pulse is no longer available at terminal 8 the magnetic field of N1 decays and the core T1 will decrease in magnetization from its "1" saturation point to its "1" remanent level (see FIG. 3) which in a preferred embodiment will mean that the core is at its ONE state indicating that a binary digit 1 is stored thereon. In its other remanent state the core T1 would be in its ZERO state. Each of the T1 cores will be in one or the other state indicating either ONE or ZERO in a binary sense.

In order to shift the signals appearing in successive T1 cores, it is necessary to supply a shift current at terminal 12 through the coils N3 to a terminal at 12'. This shift current has a polarity such that it will drive each of the magnetic cores T1 in the direction of its ZERO saturation state until ZERO saturation is reached, after removal of the current the cores will return to the ZERO remanent state until new input signals are supplied. If a given core has been magnetized to the ONE state prior to the application of the shift current, it will be forced by shift current to undergo a large change in its magnetic state so that it will produce a large change of the magnetic field linking the windings of the coil N2 producing a potential of several volts across the diode CR2 and the condenser C1 causing the condenser to charge.

It will be seen from the foregoing that when shift current is applied at terminal 12 all of the cores are driven to their ZERO saturation state. Those that have been in the ONE remanent state will pass through a sizeable flux transition inducing sufficient potential in their output windings N2 to charge the capacitors C1 to several volts. But, those cores which have been in the ZERO remanent state will pass through a much smaller flux change and will charge their capacitors C1 to a much smaller voltage level.

During all this time the transfer line indicated at 14 in FIG. 1 and in FIG. 2 is held at a positive potential so that the capacitors C1 see only the reverse biased diodes CR1 and have no discharge path. Following the end of the shift current pulse and the return of all the cores to the ZERO remanent state, the transfer line 14 is switched by conventional means not shown to the ground line potential through its terminal 16 so that the capacitors C1 are discharged through the resistors R1 and the input windings N1 of the cores to the right of them. The discharge of those capacitors which have been charged to several volts is sufficient to switch the cores to their right to the ONE remanent state. Capacitors C1 that have been only slightly charged will have insufficient energy to shift the cores to their right significantly away from the ZERO remanent states. The resistor R1 serves to damp the LC resonant circuit formed by capacitor C1 and the self-inductance of input winding N1 to prevent polarity reversal in capacitor C1. Such a polarity reversal would cause current to flow into the winding of the preceding core to cause a partial setting of the preceding core in the "1" direction.

Figure 3:
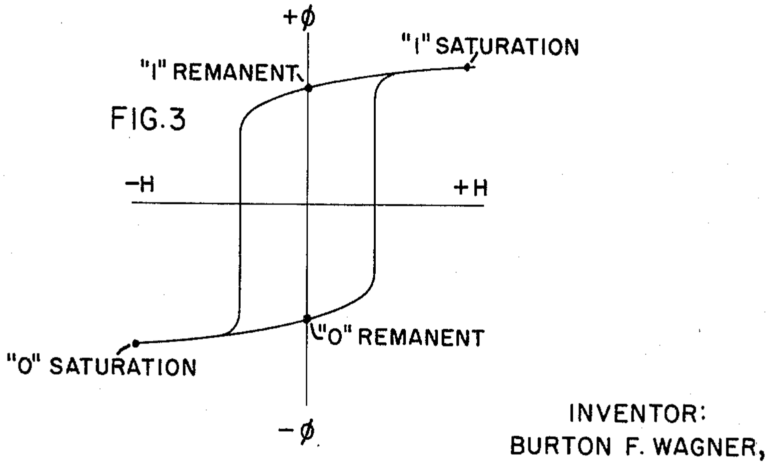
FIG. 3 is a diagram showing an approximate hysteresis loop including an illustration of certain terms of interest in the invention.

A simplified hysteresis loop for one of the toroidal cores T1, assuming that it is made of square loop material, is shown in FIG. 3. This loop is of a familiar form such that its characteristics need not be discussed in detail, but the existence of saturation points as indicated at the ONE saturation and the ZERO saturation points and of remanent points such as those at ONE remanent and ZERO remanent are pointed out as a reminder of what the terms mean as used in connection with the description of the present invention.

Figure 4:
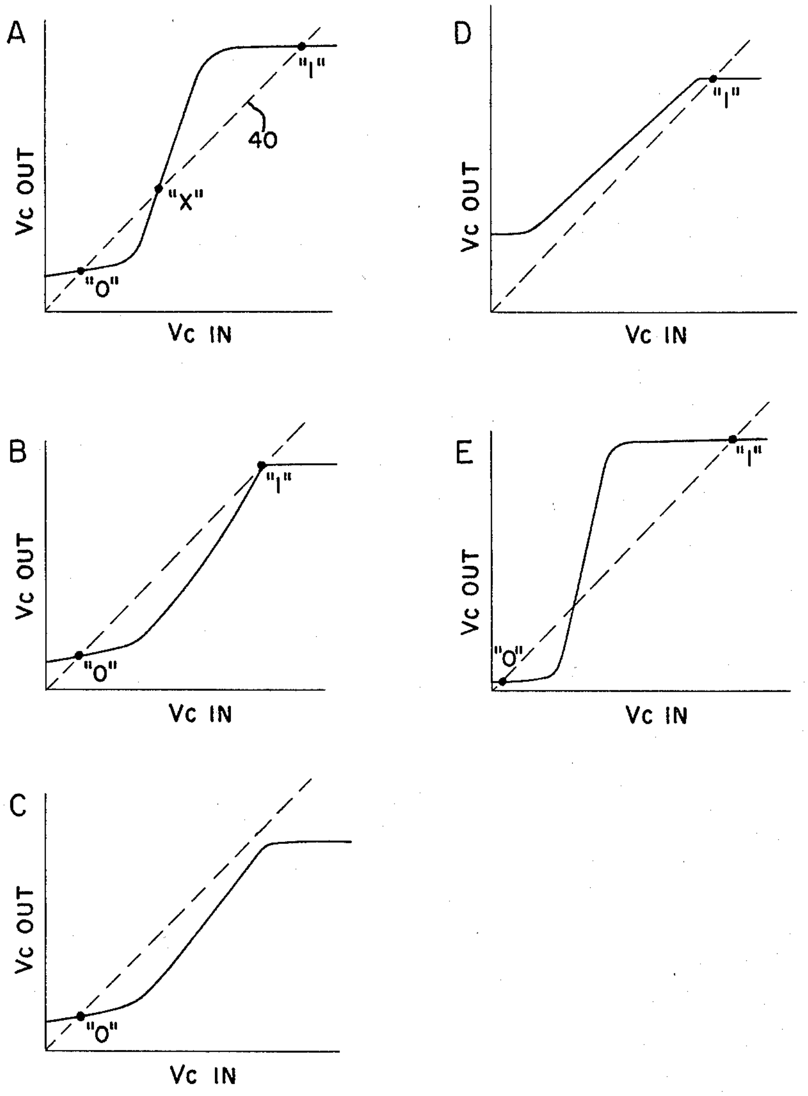
FIG. 4 is a group of charts showing characteristics of the prior art and of the present invention.

FIG. 4A–4D shows some of the characteristics of a single shift register bit by showing a plot of its output potential as it applies across an output capacitor as opposed to its input voltage as it might be applied across an inut capacitor. FIG. 4A shows a typical S curve superimposed upon a 45° unity gain line at 40. The unity gain line crosses the S curve at points labeled "1" and "0" which correspond to potentials representing binary ONE and ZERO. If one imagines a long cascade of identical shift register bits, it can be shown that a signal being serially shifted down the register must eventually stabilize at one or another of the unity gain values labeled "1" or "0." The third unity gain value, labeled "$x$" is not stable and cannot be maintained.

In FIG. 4A it will be noted that the "0" stable point has a significant amplitude displaced from the origin of the axes. This is due to the fact that the magnetic core when at this "0" remanent point is magnetized appreciably less than it is in the zero saturation region. For some applications this small zero value is not significant but in other applications, particularly those involving parallel readout of information, it is desirable to reduce the effects of the zero remanent to zero saturation magnetic field change as much as possible. If parallel readout is employed, at either terminals 5 or 7, either some portion of the capacitor charging current will be diverted out of a parallel tap or some portion of the capacitor charge will be removed after charging is completed but before the switch action via the transfer line is accomplished. In either case, increasingly severe loading will flatten out the S curve as is indicated in FIG. 4B and FIG. 4C and the ONE signal will become as indicated in 4B or not be reached at all as indicated in 4C. If parallel loading becomes so severe that the "1" unity gain point is not present, then the serially shifted information will tend to be degraded to all zeros. A partial remedy for this situation is to increase the magnitude of the shift current to raise the S curve, however, with very heavy parallel loading this remedy will often lead to the situation shown in FIG. 4D in which the "0" point is no longer in existence and the information intends to become all "1's."

Turning again to FIG. 2 we note a preferred embodiment of the invention incorporating most of the components illustrated in FIG. 1 and using the same symbols to designate the corresponding parts. The functioning of the circuits shown in FIG. 2 is like that of the circuits shown in FIG. 1 in many particulars. This is especially true with respect to the general mechanism of transferring bits from one shift register to the next. The changes between FIG. 1 and FIG. 2 include the addition of one more toroidal core T2 made of square loop material, to each part of the shift register, the addition of a winding N4 which serves as the output winding for the core T2, and the extension of the winding N3 from the shift line to couple to the core T2. It should be noted that the second core T2 has no input winding corresponding to N1, but that it does have an output winding N4 which is connected in series opposition with the output winding N2 of the main core T1. It follows from this that the main core T1 may be at either the ONE or the ZERO remanent state depending on whether or not it has received an input, but the extra core T2, having no input winding, will always be in either the saturation or the remanent ZERO state.

From the foregoing, it will be apparent that if both cores T1 and T2 are in the ZERO state when a shift current is applied to N3, both cores will switch from the ZERO remanent to the ZERO saturation state. The individual potentials they will produce in their output windings during this period will be small potentials of nearly equal magnitude which are coupled by their opposed windings to cancel each other. The result will be depression of the ZERO signal appearing at either terminal 5 or 7 to near the origin as illustrated in FIG. 4E. If the main core T1 has been in the ONE remanent state, its output would far exceed that of T2 so that only a small depression of the ONE signal across N2 would be noticed.

The effect of the foregoing is to provide a shift register of much more nearly ideal properties than has been available heretofore. The greatly enhanced stability indicated by FIG. 4E will permit the user to compensate for heavy parallel loading by simply increasing the shift current without either of the undesirable effects illustrated in FIG. 4C or FIG. 4D.

It will be seen that the objects above, among those made apparent from the preceding description, are efficiently attained. Since certain changes may be made in the above construction, such as reversing the diodes CR1 and the polarities applied to them on terminals 2 to provide a circuit which is responsive to signals of opposite polarity, without departing from the scope of the invention, it is intended that all matter contained in the above description or shown in the accompanying drawings shall be interpreted as illustrative and not in a limiting sense.

What I claim and desire to secure by Letters Patent of the United States is:

1. In a magnetic core storage device, a first magnetic core disposed to be driven to alternate magnetic states by magnetic fields produced by current in an input winding in response to input signals, a second magnetic core, a shift winding disposed in response to shift signals to produce changing magnetic fields in said first and second magnetic cores to drive said cores toward a ZERO magnetic saturation state, a first output winding coupled to sense the presence of changes in the magnetic field in said first magnetic core in response to said shift signals, a second output winding coupled to sense the presence of changes in the magnetic field in said second magnetic core in response to said shift signals, and means connecting said first and second output windings in series opposition.

2. A magnetic core storage device comprising a first magnetic core disposed to be driven to alternate magnetic states by magnetic fields induced in an input winding in response to input pulses, a second magnetic core, a shift winding disposed in response to shift pulses to produce changing magnetic fields coupling through said first and second magnetic cores to drive said cores to a ZERO magnetic saturation state, a first output winding coupled to sense the presence of changes in magnetic fields produced by said first magnetic core in response to said changing magnetic fields caused by said shift signals, a second output winding coupled to sense the presence of changes in magnetic fields produced by said second magnetic core in response to said changing magnetic fields caused by said shift signals, and means connecting said first and second output windings in series opposition.

3. A magnetic core storage device comprising a first magnetic core disposed to be driven to alternate magnetic states by magnetic fields induced in an input winding in response to input pulses, a second magnetic core, a shift winding disposed in response to shift pulses to produce changing magnetic fields coupling through said first and second magnetic cores to drive said cores to a ZERO magnetic saturation state, a first output winding coupled to sense the presence of changes in the magnetic fields from said first magnetic core in response to the change in the magnetic state of said core, a second output winding coupled to sense the presence of changes in the magnetic fields from said second magnetic core in response to the change in the magnetic state of said second core, and means connecting said first and second output windings in series opposition.

4. A magnetic core storage device comprising a first magnetic core disposed to be driven to alternate magnetic states by magnetic fields induced in an input winding in response to input pulses, a second magnetic core, a shift winding disposed in response to shift pulses to produce changing magnetic fields coupling through said first and second magnetic cores to drive said cores to a ZERO magnetic saturation state, a first output winding coupled to sense the presence of changes in the magnetic field from said first magnetic core in response to the change in the magnetic state of said core, said first output winding providing a first output potential in response to said changes in the magnetic field from said first magnetic core, a second output winding coupled to sense the presence of changes in the magnetic fields from said second magnetic core in response to the change in the magnetic state of said second core, said second output winding providing a second output potential in response to said changes in the magnetic field from said second magnetic core, and means connecting said first and second output windings in series opposition to provide a third output potential equal to the difference between said first output potential and said second output potential.

5. In a magnetic core shift register a first magnetic core of square loop material, means for driving said core to alternate magnetic states in response to signals indicating ONE or ZERO, a second magnetic core of square loop material, said second magnetic core being normally in a ZERO remanent state, shifting means including coils linking said first and second magnetic cores together to drive them both toward a magnetic ZERO saturation state in response to shift signals, output means including a first coil magnetically linked to said first core to provide an output potential when said first core is driven toward the ZERO saturation state, output means including a second output coil magnetically linked to said second core to provide an output potential when said second core is driven from the ZERO remanent state toward the ZERO saturation state, means connecting said output coils in series opposition to cancel that part of said output signals induced by magnetic fields sweeping between the ZERO remanent and the ZERO saturation states.

6. In a magnetic core shift register a first magnetic core of square loop material, means for driving said core to alternate magnetic states in response to signals indicating ONE or ZERO, a second magnetic core of square loop material, said second core being normally in a ZERO remanent state, shifting means including coils linking said first and second magnetic cores together to drive them both toward a magnetic ZERO saturation state in response to shift signals, output means including a first coil magnetically linked to said first core to provide an output potential in response to a flux transition occurring when said first core is driven toward the ZERO saturation state, output means including a second output coil magnetically linked to said second core to provide an output potential in response to a flux transition occurring when said second core is driven from the ZERO remanent state toward the ZERO saturation state, and means connecting said output coils in series opposition to cancel that part of said output signals induced by magnetic fields sweeping between the ZERO remanent and the ZERO saturation states.

7. A magnetic core storage device comprising a first magnetic core having first and second magnetic saturation states and first and second magnetic remanent states, a second magnetic core having first and second magnetic saturation states and first and second magnetic remanent states, an input winding coupling magnetically to said first magnetic core in response to input signals to drive said first magnetic core to its first saturation state, a shift winding coupling magnetically in response to shift signals to said first magnetic core and to said second magnetic core to drive said first and second magnetic cores to their second saturation states, a first output winding coupled to generate a first output signal in response to changes in said first magnetic core, a second output winding coupled to generate a second output signal in response to changes in said second magnetic core, and means coupling said first and second output windings to provide series opposition between said first and second output signals.

8. A magnetic core storage device comprising a first magnetic core having first and second magnetic saturation states and first and second magnetic remanent states, a second magnetic core having first and second magnetic saturation states and first and second magnetic remanent states, an input winding coupling magnetically to said first magnetic core in response to input signals to drive said first magnetic core to its first saturation state, a shift winding coupling magnetically in response to shift signals to said first magnetic core and to said second magnetic core to drive said first and said second magnetic cores to their second saturation states, a first output winding coupled to generate a first output signal in response to changes in said first magnetic core, a second output winding coupled to generate a second output signal in response to changes in said second magnetic core, and means coupling said first and second output windings in series opposition to provide a third output signal proportional to the difference between said first output signal and said second output signal.

9. A magnetic core shift register having a plurality of stages, each of said stages comprising a first magnetic core disposed to be driven to alternate magnetic saturation states by magnetic fields produced by current in an input winding in response to input signals, a second magnetic core, a shift winding disposed in response to shift signals to produce changing magnetic fields in said first and second magnetic cores to drive said cores toward a ZERO magnetic saturation state, a first output winding coupled to sense the presence of changes in the magnetic field from said first magnetic core in response to said shift signals, a second output winding coupled to sense the presence of changes in the magnetic field from said second magnetic core in response to said shift signals, means connecting said first and second output windings in series opposition to provide an output signal to be stored in storage means, and means in each stage of said magnetic core shift register to respond to transfer signals to apply said signal stored in said storage means to means to drive a first magnetic core in the succeeding stage to a magnetic saturation state.

10. A magnetic core shift register having a plurality of stages, each of said stages comprising a first magnetic core disposed to be driven to alternate magnetic saturation states by magnetic fields produced by current in an input winding in response to input signals, a second magnetic core, a shift winding disposed in response to shift signals to produce changing magnetic fields in said first and second magnetic cores to drive said cores toward a ZERO magnetic saturation state, a first output winding coupled to sense the presence of changes in the magnetic field from said first magnetic core in response to said shift signals, a second output winding coupled to sense the presence of changes in the magnetic field from said second magnetic core in response to said shift signals, means connecting said first and second output windings in series opposition to provide an output signal to be stored in storage means, and means for shifting the output signal stored in the storage means of each stage of the magnetic shift register to a succeeding stage.

11. A magnetic core shift register comprising a plurality of stages, each stage including a first magnetic core and a second magnetic core, first driving means coupled to drive said first magnetic core to a magnetic saturation state in response to a driving potential representing one bit of a binary number, second driving means to drive said first magnetic core and said second magnetic core to a magnetic saturation state in response to shift signals, first means in each stage to generate a first potential in response to changes in the first magnetic core caused by said shift signals in said second driving means, second means in each stage to generate a second potential in response to changes in the second magnetic core caused by shift signals in said second driving means, means for algebraically combining said first and second potentials to provide a corrected potential to a storage device in each stage and means for transferring said corrected potential to the first driving means of a successive stage of said shift register to shift said bit of a binary number to said successive stage of said magnetic core shift register.

No references cited.

BERNARD KONICK, *Primary Examiner.*

G. LIEBERSTEIN, *Assistant Examiner.*